March 10, 1925. Re. 16,021

G. P. A. WEISENBORN

CHURN

Original Filed March 1, 1918

INVENTOR.
George P. A. Weisenborn
BY
By W. H. Ommen
ATTORNEY.

Reissued Mar. 10, 1925. Re. 16,021

UNITED STATES PATENT OFFICE.

GEORGE P. A. WEISENBORN, OF SEATTLE, WASHINGTON.

CHURN.

Original No. 1,337,864, dated April 20, 1920, Serial No. 219,905, filed March 1, 1918. Application for reissue filed June 4, 1923. Serial No. 643,465.

*To all whom it may concern:*

Be it known that I, GEORGE P. A. WEISENBORN, a citizen of the United States, residing at Seattle, in the county of King and State of Washington, have invented new and useful Improvements in Churns, of which the following is a specification.

This invention comprehends generally improvements in agitators and more particularly has reference to a churn.

It is the primary aim and object of the present invention to provide a device of the above character designed so that it will continuously reciprocate vertically subsequent to the imparting of movement thereto so as to agitate the liquid or material within the receptacle.

It is an equally important object of this invention to provide in conjunction with the reciprocating receptacle a dasher designed to be held stationary so as to thoroughly agitate and mix the material within the receptacle during the reciprocatory movement of the device.

As a further improvement, this invention includes the provision of a device of the above character wherein an adjustable spider is employed so as to assure of the maintenance of various sized receptacles in position in a device, and to admit of their being easily and quickly attached to and removed from their supporting means.

More particularly, this invention contemplates the provision of a device of the above mentioned character designed for making ice cream, churning milk, and in addition being capable of mixing various other liquids or materials.

Among the other aims and objects of this invention may be recited the provision of a device of the above mentioned character with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which.

Similar characters of reference are employed in all of the above described views, to indicate corresponding parts.

Figure 1:
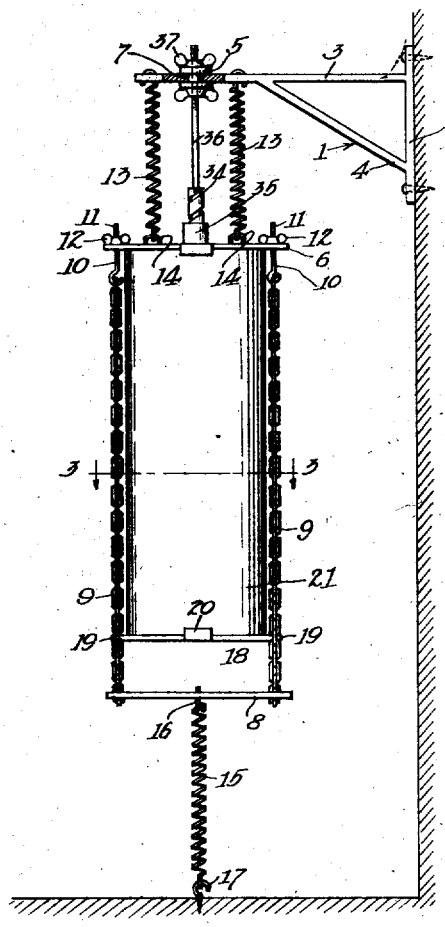
Figure 1 is a side elevation of the invention.
Figure 2:
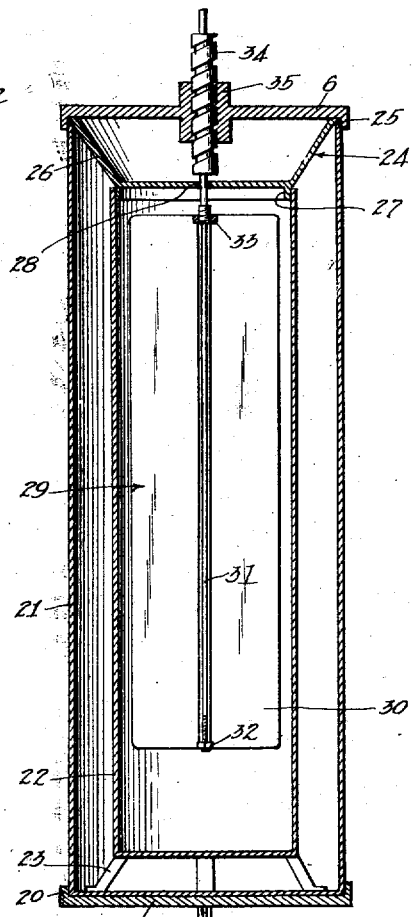
Fig. 2 is a vertical section of the invention partly in elevation.
Figure 3:
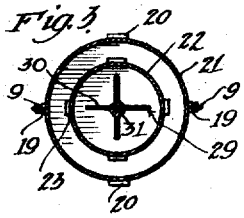
Fig. 3 is a transverse section taken on line 3—3 of Fig. 1.
Figure 4:
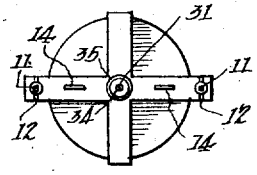
Fig. 4 is a top plan view of the device.

Referring now, more particularly, to the accompanying drawings, there is provided a bracket indicated in its entirety by the numeral 1 which consists generally of an attaching plate 2 from which projects a lateral arm 3, supported with respect to the plate through the instrumentality of a brace 4. The outer end of the arm is formed with an opening in which is fitted a vertically disposed nipple 5 for a purpose that will presently appear.

An upper cross piece 6 is now employed and is formed with a central opening 7. Cooperating with the upper cross piece 6 is a lower cross bar 8 while connected to the respective ends of the cross bar are suitable flexible elements such as chains 9, the upper ends of which are engaged in adjacent hook bolts 10, the threaded shanks 11 of which are arranged through one of the arms of the cross piece 6, and adjustably supported therein by means of wing nuts 12. By this arrangement it is apparent that the distance between the cross piece 6 and the cross bar 7 may be varied.

In order to assure of a continuous reciprocatory movement of the device, coil springs 13 are employed and have their upper ends connected in the arm 3 and their lower ends engage in U-shaped bolts 14 on one of the arms of the cross piece 6, as indicated. Another coil spring 15 has its upper end engaged in a U-bolt 16 and cross bar 8, and its lower end detachably engaged in a hook 17 which is mounted at a point directly beneath the bracket 1, as indicated.

As intimated, improved means have been employed for adjustably supporting a receptacle in a device, and in reducing this feature of the invention to practice, a spider indicated in its entirety by the numeral 18 is employed. Hooks 19 are formed on the opposite ends of one of the cross bars and are designed for engagement with any of the opposed links of the chains 9 while the other cross arm is formed with flanges 20 which are designed to engage the opposite points of a main receptacle 21 when the latter is seated on the spider. The hooks 19 may be in the form of projections to engage in the links of the chain, and they will be held against displacement by the chains being drawn taut when the receptacle 21 is clamped in place. These projections also are so formed that they will form trunnions upon which the spider can rotate; so that it may be tilted when the receptacle is being put in place. By making the spider thus rotatable the ease with which the receptacle may be attached or removed is greatly facilitated.

A secondary receptacle 22 is mounted within the main receptacle and is formed with supporting legs 23 engageable with the bottom of the main receptacle. An improved cover 24 is now employed and is designed for removably closing both the receptacles. This cover consists generally of a disk 25 formed with a depending annular concentric portion 26 which in turn is formed with a depending annular flange 27. This flange telescopes within the secondary receptacle 22 and serves to cooperate with the under surface of the depending portion 26 in closing said secondary receptacle. The cover is provided with a central opening 28 for a purpose that will presently appear.

With a view toward providing improved means for cooperating with the secondary receptacle in assuring of a thorough agitating of the liquid therein, a scraper or dasher indicated in its entirety by the numeral 29 is provided and consists of a plurality of radially arranged blades 30 which are designed to be vertically disposed within the receptacle 22. A supporting rod 31 is extended centrally through the dasher and is engaged at its lower end by a nut 32 which serves as a support, while cooperating with the nut 32 is another nut 33 which bears against the upper edge of the dasher and prevents reciprocatory movement of the dasher. This rod is extended upwardly, and is disposed through the opening 28, being formed with a spiral portion 34 which cooperates with the correspondingly formed collar 35 which in turn is formed on the upper surface of the cross piece 6 above the opening 7 therein. The upper end of the rod is threaded as at 36 and is disposed through the nipple 5 being capable of partially rotary movement therein while wing nuts 37 are adjustably engaged on the threaded portion 36 and contact with the upper and lower surfaces of the nipple 5 in assuring of the supporting of the rod and the dasher in a stationary position. It is appreciated by the construction described that the rod is allowed to rotate yet is prevented from vertical movement.

The mode of operation of the present invention may be reviewed as follows: Assuming that the parts have been assembled in the manner described, and as illustrated in the drawings, upon moving the cross piece 6 against the tension of either of the springs 13 and 15 and releasing the cross piece one of the springs will contract while the other expands, and this operation will be continuous until the springs become counterbalanced; yet it is apparent before this occurs another movement may be imparted to the cross piece 6. During this vertical reciprocatory movement of the receptacle 22, the dasher 30 which is held in stationary position will agitate the material within the receptacle 22 and by reason of the fact that the internally spiral collar 33 reciprocates with the receptacle and engages the spiral portion 34 the rod and consequently the dasher 30 will be alternately rotated in different directions and will assure the scraping of the sides of the receptacle and in addition agitate the liquid therein. This scraping of the sides of the receptacle is especially desirable when ice cream is being made in the device. It is of course apparent that when ice cream is being made that cracked ice is placed in the receptacle 21 and about the outer sides of the receptacle 22 to assure of the freezing action. Of course when butter is being churned or other liquids being agitated, it is unnecessary to place ice in the receptacle 21. To adjust the relation of parts and to accommodate a smaller receptacle the spider 18 is detached from certain of the opposed links and engaged in other opposed links nearer to the cross piece 6 whereupon the receptacle is placed in position above the spider while the wing nuts 12 are finally adjusted to clamp the cross piece against the top of the receptacle and in this manner hold the receptacle against displacement. By making the spider 18 rotatable between the chains 9 it may be tilted to first receive the bottom of the receptacle 21 after which the top is then swung into position beneath the cross piece 6 and is then clamped in place by turning the nuts 12. This not only facilitates putting the receptacle 21 in place, but it will require a minimum adjustment of the nuts 12 for clamping it.

It is believed in view of the foregoing description that a further detailed description of the operation of the invention is entirely unnecessary. Likewise, it is thought that the advantages of the invention will be readily apparent.

As many changes could be made in the above construction and many apparently widely different embodiments of this invention could be made without departing from the scope thereof, and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

Having thus fully described this invention, what is claimed as new and desired to be secured by Letters Patent, is:—

1. A churn comprising in combination a supporting bracket, a receptacle, means for attaching the receptacle to the bracket so that the former may be reciprocated, a rod rotatably mounted on the supporting bracket, the rod entering the receptacle through the top thereof, and a dasher carried by the rod within the receptacle, the rod having an enlarged portion where it passes through the top of the receptacle, the top of the receptacle being formed with a collar having an internal spiral rib which engages a spiral groove in the enlarged portion of the rod, whereby the reciprocation of the receptacle will result in relative longitudinal movement between the dasher and the receptacle as well as rotary movement of the dasher within the receptacle.

2. A device of the character described including a cross piece, a cross bar, flexible members connecting the cross piece and the cross bar, a spider having diametrically opposite projections removably engaging the flexible members and constituting rotatable trunnions for the spider, a receptacle seated on the spider and positioned adjacent the cross piece, means co-operating with the flexible members and cross piece for clamping the receptacle in position, and resilient means connected to the cross bar for assuring a continuous reciprocation of the device after starting.

3. A device of the character described including a cross piece, a cross bar, chains connected to the cross bar, means adjustably connecting the chains to the cross piece, a spider formed with diametrically opposite projections engaging opposed links in the chain and constituting rotatable trunnions for the spider, a receptacle seated on the spider and positioned beneath the cross piece, the adjustable connection between the chains and the cross piece constituting a clamp for holding the receptacle on the spider, and resilient means connected to the cross piece and to the cross bar for assuring a continuous reciprocation of the device when started.

4. A device of the character described including a cross piece, a cross bar, flexible members connecting the cross piece and the cross bar and provided with a plurality of spaced apertures, a spider having diametrically opposite projections removably engaging aligned apertures in said members and constituting rotatable trunnions for the spider, a receptacle seated on the spider and positioned beneath the cross piece, the cross piece and spider having flanges to hold the receptacle against lateral displacement, means co-operating with the flexible members and cross piece for clamping the receptacle in position, and resilient means connected to the cross bar for assuring a continuous reciprocation of the device after starting.

5. A device of the character described, including a cross piece, a cross bar, chains connected to the cross bar, means adjustably connecting the chains to the cross piece, a spider formed with diametrically opposite projections engaging opposed links in the chain and constituting rotatable trunnions for the spider, a receptacle seated on the spider and positioned beneath the cross piece, the adjustable connection between the chains and the cross piece constituting a clamp for holding the receptacle on the spider, resilient means connected to the cross piece and to the cross bar for assuring a continuous reciprocation of the device when started, and a dasher arranged within the receptacle and adapted to be automatically rotated as the receptacle reciprocates.

6. A device of the character described, including a cross piece, a cross bar, flexible members connecting the cross piece and the cross bar and provided with a plurality of spaced apertures, a spider having diametrically opposite projections removably engaging aligned apertures in said members and constituting rotatable trunnions for the spider, a receptacle seated on the spider and positioned beneath the cross piece, the cross piece and spider having flanges to hold the receptacle against lateral displacement, means cooperating with the flexible members and cross piece for clamping the receptacle in position, resilient means connected to the cross bar for assuring a continuous reciprocation of the device after starting, and a dasher arranged within the receptacle and adapted to be automatically rotated as the receptacle is reciprocated.

In witness that I claim the foregoing, I have hereunto subscribed my name this 7th day of May, 1923.

GEO. P. A. WEISENBORN.

Witnesses:

J. E. MIEDING,

CHARLOTTE HANEY.